(12) United States Patent
Foo et al.

(10) Patent No.: US 8,430,044 B2
(45) Date of Patent: Apr. 30, 2013

(54) VEHICLE

(75) Inventors: Kok Seng Foo, Singapore (SG); Chin Kau Quah, Singapore (SG); Kai Li, Singapore (SG); Morten Scharffscher, Trondheim (NO); Petter Scharffscher, Trondheim (NO); Sveinung Loset, Trondheim (NO)

(73) Assignees: Keppel Offshore & Marine Technology Centre Pte Ltd (SG); Team Innovation Trondheim AS (NO)

( * ) Notice: Subject to any disclaimer, the term of this patent is extended or adjusted under 35 U.S.C. 154(b) by 327 days.

(21) Appl. No.: 12/559,808

(22) Filed: Sep. 15, 2009

(65) Prior Publication Data

US 2010/0130077 A1    May 27, 2010

(30) Foreign Application Priority Data

Sep. 16, 2008    (SG) ................................ 200806917-1

(51) Int. Cl.
    *B63B 35/08*    (2006.01)
(52) U.S. Cl.
    USPC ........................................ 114/40; 440/12.65
(58) Field of Classification Search .................. 114/368, 114/39.28, 40–42; 440/48, 12.65
    See application file for complete search history.

(56) References Cited

U.S. PATENT DOCUMENTS

| | | | | |
|---|---|---|---|---|
| 2,568,903 | A | * | 9/1951 | Vassar .............................. 440/48 |
| 2,891,262 | A | * | 6/1959 | Miller ........................... 114/368 |
| 4,070,062 | A | * | 1/1978 | Morgan et al. .................. 299/10 |
| 4,170,187 | A | * | 10/1979 | Schirtzinger ................. 114/264 |
| 4,198,917 | A | * | 4/1980 | Oshima et al. .................. 114/42 |
| 4,734,067 | A | * | 3/1988 | Elias-Reyes .................... 440/48 |
| 4,864,950 | A | * | 9/1989 | Herkens et al. ................. 114/40 |
| 5,255,624 | A | * | 10/1993 | Legare ............................ 114/68 |

OTHER PUBLICATIONS

Ice Challenger Snowbird 6; http://www.icechallenger.com/icechallenger/; retrieved Sep. 14, 2009.
TEMPSC; http://en.wikipedia.org/wiki/TEMPSC; last updated Jun. 21, 2009; retrieved Sep. 14, 2009.
O'Brien, Daniel P., "Seascape System of Evacuation," 17th Int'l Symposium on Ice, St. Petersburg, Russia, Jun. 21-25, 2004, International Association of Hydraulic Engineering and Research, p. 217-.
Arktos; http://222.arktoscraft.com/; last updated Dec. 3, 2008; retrieved Sep. 14, 2009.

* cited by examiner

*Primary Examiner* — Stephen Avila
(74) *Attorney, Agent, or Firm* — Spell & Wilmer L.L.P.

(57)    ABSTRACT

A vehicle for use in arctic environments, the vehicle comprising a hull for accommodating people, and a pair of rotatable propulsion screws connected to the hull for propelling the vehicle on water, ice, snow and land. Each propulsion screw comprises a shaft having at least one blade helically disposed therearound.

18 Claims, 6 Drawing Sheets

VEHICLE

CROSS-REFERENCE TO RELATED APPLICATIONS

This application claims priority to Singapore Patent Application No. SG 200806917-1 entitled "A VEHICLE," filed on Sep. 16, 2008, which is incorporated herein by reference.

FIELD OF THE INVENTION

This invention relates generally to vehicles and relates more particularly, though not exclusively, to a vehicle suitable for use in arctic environments.

BACKGROUND OF THE INVENTION

Manned offshore rigs are required to have access to evacuation at all times so that in an emergency, people working on a rig may be quickly and safely evacuated. Evacuation may be direct by means of helicopters if possible. Alternatively, people may be evacuated by vehicles to move them away from the emergency or hazard at the offshore rig to a safe location where they and the vehicle may be picked up by a rescue vessel.

For offshore rigs in waters that may be ice-infested for parts of a year or on a permanent basis, such as in the Arctic region or the Caspian Sea, a vehicle may be required to move through open water, partly ice-covered water, ice, snow and/or land. Currently, vehicles in use for evacuation comprise conventional life boats or life rescue craft such as the Seascape LRC or totally enclosed motor propelled survival craft (TEMPSC). These vehicles are unable to break ice and cannot be manoeuvred effectively in water with more than 40% ice cover.

An amphibious vehicle such as the Arktos™ uses tracks for land movement while water propulsion jets provide thrust for movement through water. However, safety issues have arisen over use of the Arktos™ due to a capsize during a test as well as concerns that have been raised over instability of the Arktos™ when moving partly on ice.

SUMMARY OF THE INVENTION

In general terms, the present invention proposes a vehicle that is propelled by a pair of rotatable propulsion screws. Appropriate rotation of the propulsion screws allows the vehicle to move on water, ice, snow and land. In an emergency on an offshore rig located in an arctic environment comprising ice and/or water in varying proportions, the vehicle transports people evacuated from the rig across the water and/or ice to a safe location that may be water, ice, snow or land. The vehicle includes a hull to accommodate the people, protecting them against the arctic environment. The hull is preferably fully enclosable and shaped to displace a volume of water of greater weight than the weight of the vehicle and its passengers.

In a specific expression, the present invention relates to a vehicle suitable for use in arctic environments, the vehicle comprising a hull for accommodating people, and a pair of rotatable propulsion screws connected to the hull for propelling the vehicle on water, ice, snow and land, each propulsion screw comprising a shaft having at least one blade helically disposed therearound.

Preferably the hull provides buoyancy to the vehicle. Where necessary or desired, the propulsion screw may provide buoyancy to the vehicle or supplement the buoyancy provided by the hull.

Preferably each propulsion screw comprises a cone-shaped termination at either end. This is advantageous as it reduces drag that would otherwise hinder manoeuvrability of the vehicle. The propulsion screws may include ripples on their surfaces to improve the traction of the vehicle on its operative surface (especially on ice).

Preferably at least one uprighter is disposed on a roof of the hull for righting the vehicle when the vehicle is overturned. The uprighter may be moveable relative to the roof to assist in uprighting the vehicle on land or on ice. The uprighter preferably has a higher buoyancy in water compared to other parts of the vehicle to assist in uprighting the vehicle in water.

Preferably a climber mechanism is connected to the hull for assisting in moving the vehicle out of water. The climber mechanism may be connected to the hull by extension arms, the extension arms being adjustable with respect to the hull in terms of one or more of: reach in a longitudinal direction, height and angle. In one form, the climber mechanism includes a plurality of spiked bars that are arranged parallel to and spaced apart from each other.

Preferably the vehicle further comprises a closed heating system configured to draw heat away from one or more engines of the vehicle and to circulate the heat around the hull for de-icing purposes.

Preferably the vehicle further comprises a crawler mechanism at a bottom surface of the hull. The crawler mechanism may comprise one or more rows of toothed segments configured to extend downward and rearward to lift the vehicle and to move it forward. This effectively allows the vehicle to 'crawl' its way forward in situations where the vehicle runs into an obstacle that leaves the propulsion screws substantially out of contact with the physical surface (e.g. snow, ice etc). In this form, the rows of toothed segments may be operable independently or in groups of rows, the groups being configured to extend downward and rearward in an alternating fashion. Also, the segments of different groups may be arranged adjacent one another. Selective operation of the rows may allow 'crawling' in a forward direction, rearward direction or sideways (e.g. by arranging some or all of the segments substantially perpendicular to the longitudinal axis of the vehicle). A combination of segments provided at various angles with respect to the longitudinal axis of the vehicle is also envisaged.

Preferably each propulsion screw includes two plates arranged in its internal cavity, the two plates being substantially perpendicular to one another. The propulsion screws may further include two or more holes configured to allow water to enter and exit an internal cavity of each propulsion screw. The plates may divide the internal cavity into compartments that may be selectively filled with water or emptied of water for balancing or uprighting of the vehicle.

Preferably the vehicle further comprises a boom pivotally and rotatably attached to a roof of the hull.

Preferably the vehicle is configured to be launched by freely falling from a platform of an offshore rig into water. To assist in the launching, the vehicle may comprise attachment points for connection with cables suspended from a davit on a platform of an offshore rig. The vehicle may also be configured to drive out of a garage on a platform of an offshore rig.

As will be apparent from the following description, the use of propulsion screws as the primary propulsion means for all of water, ice, snow and land by the specific embodiment above simplifies the operation of the vehicle and avoids the need to provide different propulsion means specific to the physical surface on which the vehicle travels. In addition to reducing the overall weight of the vehicle, unexpected advantages arising from the specific embodiment include stability of the vehicle when travelling on uneven icy terrain (e.g. water with more than 40% ice cover), self-righting abilities and structural rigidity that allows the vehicle to withstand free falling from a platform of an offshore rig into water. These and other related advantages will be readily apparent to skilled persons from the description below.

BRIEF DESCRIPTION OF THE DRAWINGS

In order that the vehicle of the present invention may be fully understood and readily put into practical effect there shall now be described by way of non-limitative example only exemplary embodiments, the description being with reference to the accompanying illustrative drawings.

In the drawings.

DETAILED DESCRIPTION OF EXEMPLARY EMBODIMENTS

Figure 1:
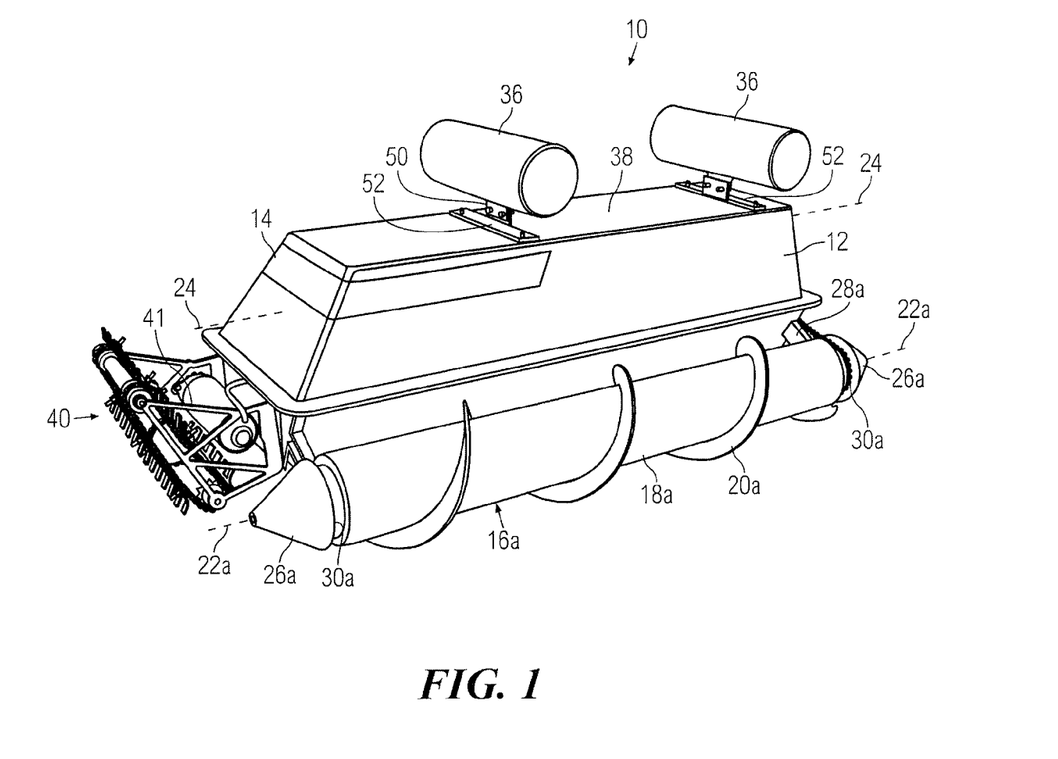
FIG. 1 is a front perspective view of an exemplary embodiment of the vehicle.
Figure 2:
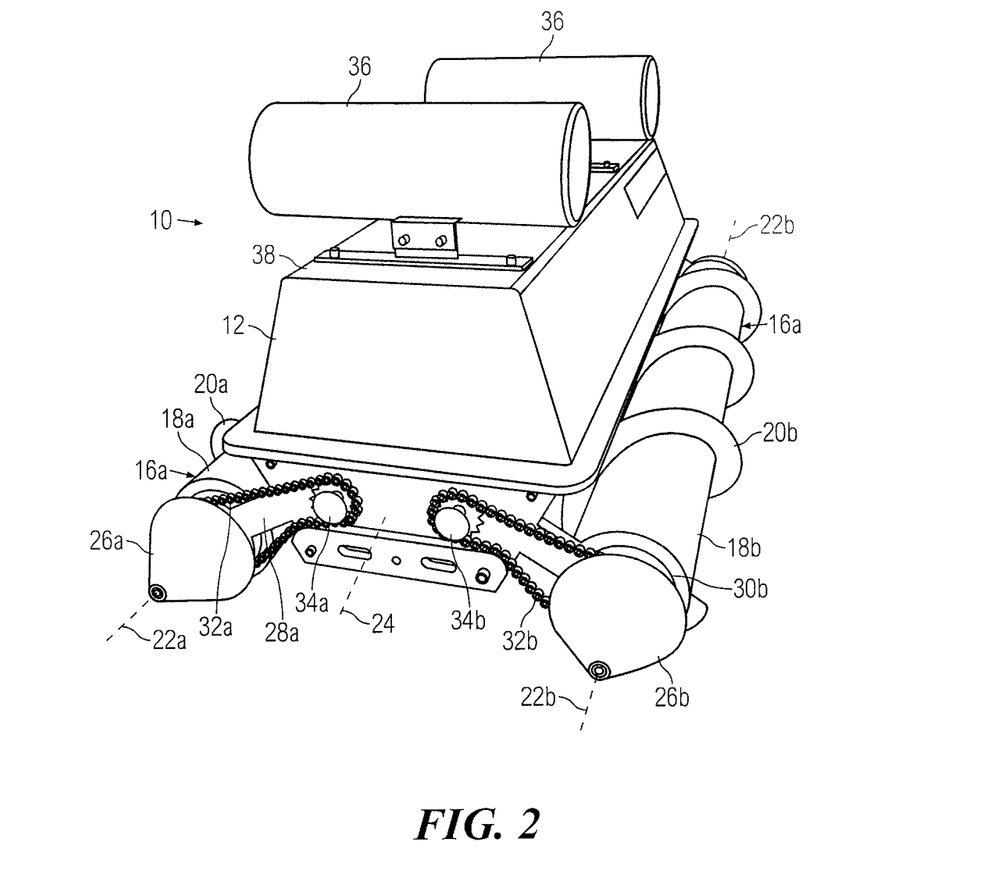
FIG. 2 is rear perspective view of the exemplary embodiment of FIG. 1.

As shown in FIGS. 1 and 2, there is provided a vehicle 10 suitable for use in arctic environments where temperatures are extremely low such that water bodies may be partially or fully frozen and there may be snow or even ice cover on land. Examples of arctic environments include the Arctic Circle and the Caspian Sea.

The vehicle 10 comprises a hull 12 for accommodating preferably up to one hundred and fifty persons. The hull 12 is preferably shaped to displace a volume of water of greater weight than the weight of the vehicle 10 and its passengers in order to provide buoyancy to the vehicle 10 in water. The hull 12 has a bottom surface of a shape that may be moulded, round-bilged, soft-chined, chined, hard-chined or any other variation such as a semi-round-bilge, S-curve, V-bottom, multi-bottom, flat and so on. The hull 12 is preferably fully enclosable and appropriately configured to safely accommodate passengers in arctic conditions for periods of at least 12 hours. A window 14 may be provided in the hull 12 to allow a person controlling the vehicle 10 to steer it by visual guidance.

The vehicle 10 is propelled by a pair of rotatable propulsion screws 16a, 16b connected to the hull 12. Each propulsion screw 16 comprises a preferably cylindrical shaft 18 having a blade 20 helically disposed therearound. Preferably, the propulsion screws 16a, 16b are each disposed on either side of the hull 12 such that a longitudinal axis 22a, 22b of each propulsion screw 16a, 16b is parallel to a longitudinal direction 24 of the vehicle 10.

The blade 20a on the shaft 18a of one 16a of the propulsion screws is preferably wound in an opposite direction from the blade 20b on the shaft 18b of the other 16b of the propulsion screws. In this way, simultaneous rotation of both propulsion screws 16a, 16b in opposite directions propels the vehicle 10 in the longitudinal direction 24. Forward and backward movement of the vehicle 10 may be achieved by reversing the direction of rotation of the propulsion screws 16a, 16b. The vehicle 10 may be steered away from the longitudinal direction 24 by independently controlling the rotation of each propulsion screw 16a, 16b. To facilitate movement of the vehicle 10 through water, each propulsion screw 16 preferably comprises a cone-shaped termination 26 at either end (shown as terminations 26a and 26b for propulsion screws 16a and 16b respectively). The internal cavity of the cone-shaped terminations 26 may be provided with buoyant material (e.g. foam) to improve buoyancy of the vehicle 10.

Each propulsion screw 16 is preferably connected to the hull 12 via connector arms 28. Two or more connector arms 28 (shown as connector arms 28a and 28b for propulsion screws 16a and 16b respectively) may be provided at intervals along each propulsion screw 16. One end of the connector arm 28 is attached to the hull 12 while the other end of the connector arm 28 comprises a collar 30 (shown as collar 30a and 30b for propulsion screws 16a and 16b respectively) for rotatably supporting the propulsion screw 16. The connector arms 28 may be configured to allow the propulsion screws 16a, 16b to be rigidly or flexibly connected to the hull 12.

The propulsion screws 16a, 16b may be hydraulically driven, or mechanically driven by one or more engines on the vehicle. In the embodiment shown in FIG. 2, the propulsion screws 16a, 16b are chain driven by means of chains 32a, 32b engaging sprockets 34a, 34b respectively that are connected to and driven by the one or more engines. To improve traction on ice, snow or land, the propulsion screws 16a, 16b may have ripples on their surfaces, i.e., on the shafts 18a, 18b and/or the blades 20a, 20b.

In some embodiments, the vehicle 10 is provided with a closed heating system that draws heat away from the one or more engines of the vehicle and that circulates the heat around the hull 12 for de-icing purposes.

To ensure safety of the vehicle 10, at least one uprighter 36 is provided on a roof 38 of the hull 12. By disposing the uprighter 36 at a topmost portion of the vehicle 10, the vehicle 10 automatically rights itself when overturned in water due to the uprighter 36 having a higher buoyancy in water compared to other parts of the vehicle 10. The uprighter 36 may be of any suitable construction such as an air-filled tank 36 as shown, or an inflatable flotation bladder that is deployed when necessary. More than one uprighter 36 may be provided. When the vehicle 10 is capsized in water, increasing perpendicular displacement of the uprighter 36 from the roof 38 also increases righting moment to right the vehicle 10 in water. For this, at least one extendable arm 50 that is preferably hydraulically operated may be provided to connect the uprighter 36 with the roof 38.

The uprighter 36 is preferably also configured to be laterally moveable with respect to the longitudinal direction 24 so that in case of the vehicle 10 overturning sideways on land or ice, for example when climbing a ridge, the uprighter 36 may be laterally moved sideways to push the vehicle 10 back upright. Lateral movement of the uprighter 36 may be achieved by providing suitable mechanisms such as a lateral sliding arrangement 52 between the uprighter 36 and the roof 38, or by pivotally connecting the extendable arm 50 to the roof 38 and appropriately rotating and/or extending the extendable arm 50 in order to move the uprighter 36 laterally.

To improve manoeuvrability of the vehicle 10, a climber mechanism 40 may be provided on the vehicle 10 to assist its movement out of water onto a physical surface such as ice, snow or land or to move it over a physical obstruction such as an ice floe. The climber mechanism 40 may be hydraulically or mechanically driven by one or more engines on the vehicle and is preferably attached to a front of the hull 12 via extension arms 41. The climber 40 mechanism is preferably adjustable with respect to the hull 12 in terms of reach in the longitudinal direction 24, height and angle. For this, the extension arms 41 may comprise a parallelogram arrangement.

Figure 3:
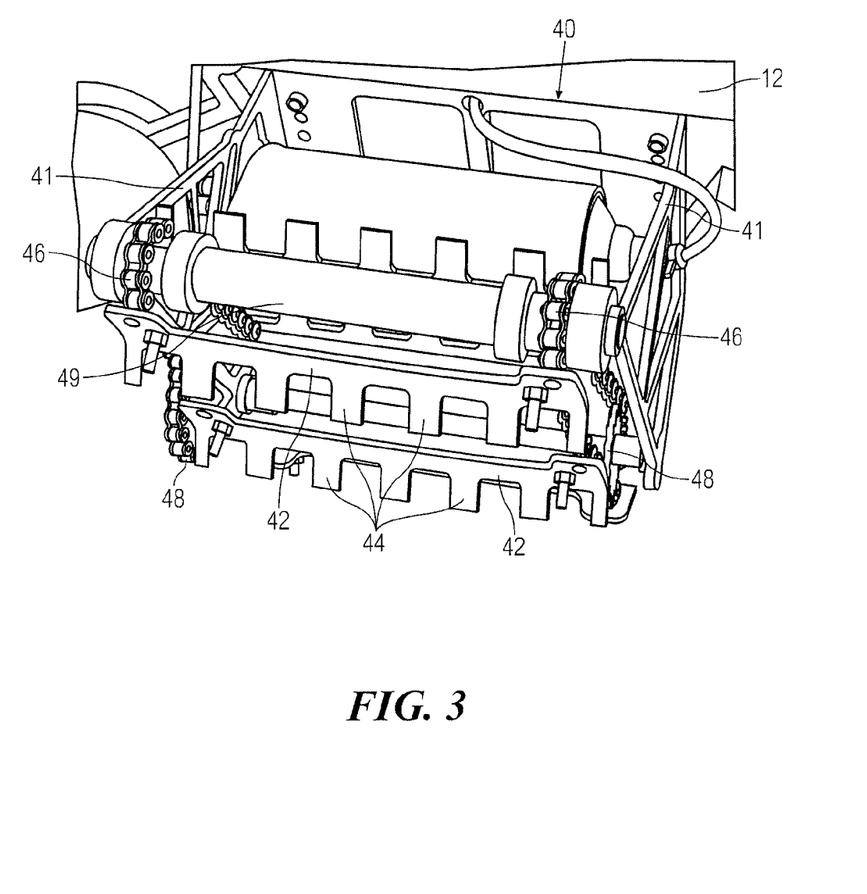
FIG. 3 is a close-up perspective view of the climber mechanism of the vehicle of FIG. 1.

As shown in FIG. 3, the climber mechanism 40 may comprise a plurality of spiked metal bars 42 disposed perpendicularly with respect to the longitudinal direction 24. The spikes 44 on each bar 42 are preferably oriented downwardly when the bar is at a foremost position for engaging ice, snow or land. Each spike 44 may have a rectangular or triangular shape. Each spiked bar 42 is preferably connected to a conveyor chain 46 at either end of the bar 42. The plurality of spiked bars 42 are arranged parallel to and spaced apart from each other on the conveyor chains 46. The conveyor chains 46 are each tensioned around a driven sprocket 48 and a roller 49 and may be mechanically driven, electrically driven using electrical cables, or hydraulically driven using flexible hydraulic hoses.

When the vehicle 10 moves in water and encounters the physical surface, the climber mechanism 40 may be activated by rotating the driven sprockets 48 so that the plurality of spiked bars 42 are rotated by the conveyor chains 46 against the physical surface. In this way, the spiked bars 42 effect a climbing action on the physical surface to move the vehicle 10 out of water onto or over the physical surface. The climber mechanism 40 may be separately and/or simultaneously activated with the propulsion screws 16 to move the vehicle 10 over the physical surface.

Figure 4:
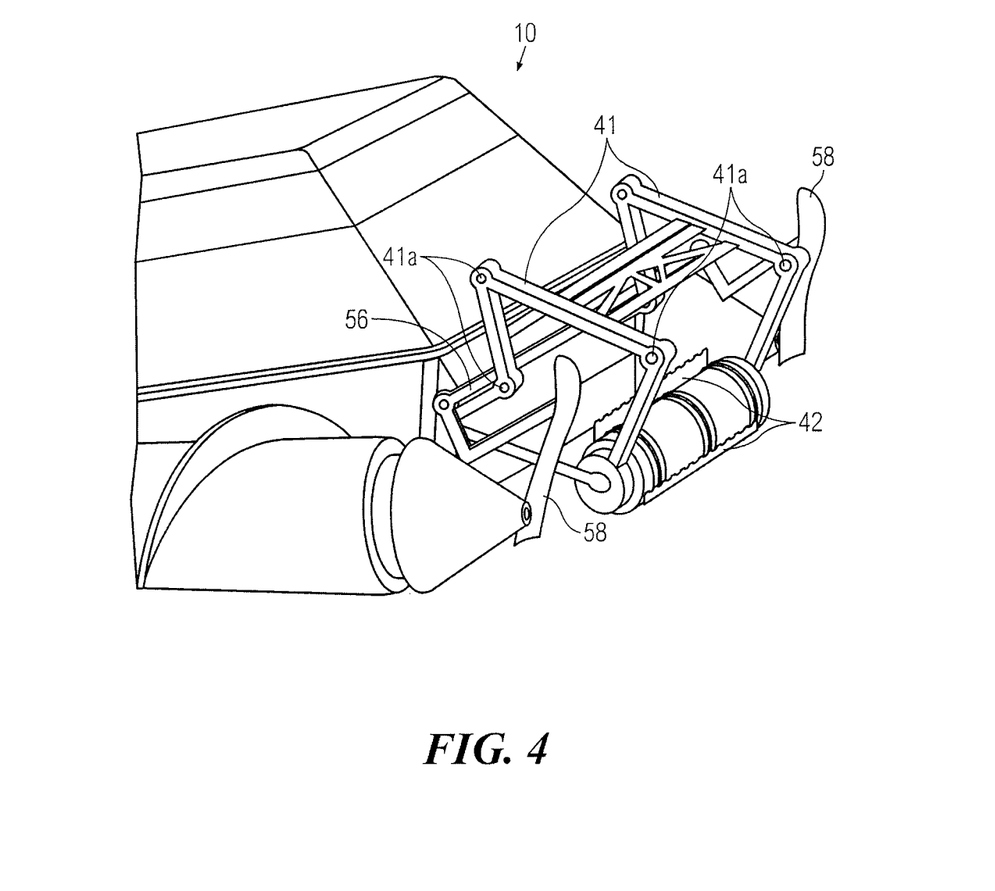
FIG. 4 is a front perspective view of the climber mechanism in an alternative embodiment.

An alternative arrangement of the climber mechanism 40 is shown in FIG. 4. The climber mechanism 40 in this arrangement is coupled to the hull by non-parallelogram extension arms 41 attached at one end to the bow of the vehicle 10 and rotatably attached at an opposite end to a belt or drum that supports the spiked bars 42. The arms 41 include two or more pivots 41a that allow the spiked bars 42 of the climber mechanism 40 to be adjustable in terms of reach in the longitudinal direction 24 and in particular with respect to the distance from the bow 56 of the vehicle 10. When the climber mechanism 40 is not required, the arms 41 are retracted to bring the climber mechanism 40 as close as possible to the bow 56. This reduces the gap between the climber mechanism 40 and the bow 56, and accordingly reduces the likelihood of ice becoming trapped in the gap (typically called an 'ice jam'), which could result in damage or destruction of the climber mechanism 40 or the bow 56 when the climber mechanism is eventually operated. The pivots 41a provided on the arms 41 also allow the climber mechanism 40 to be adjusted in terms of height and angle. Also shown in FIG. 4 are skis 58 pivotally arranged at the front of the propulsion screws for improved manoeuvrability in water or snow.

Figure 5A:
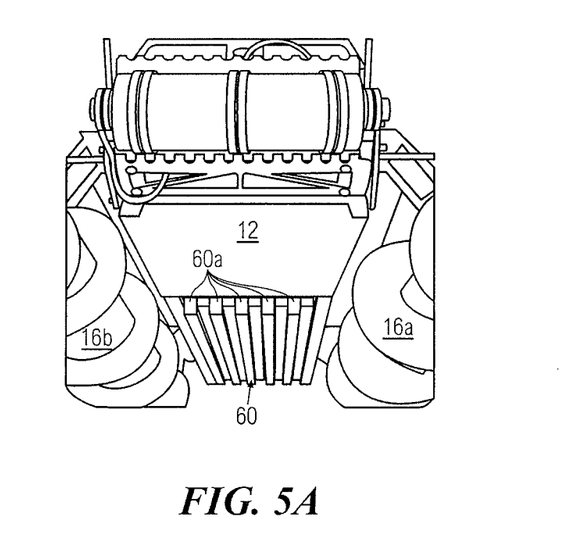
FIGS. 5A and 5B are bottom perspective views of the crawler mechanism.
Figure 5B:
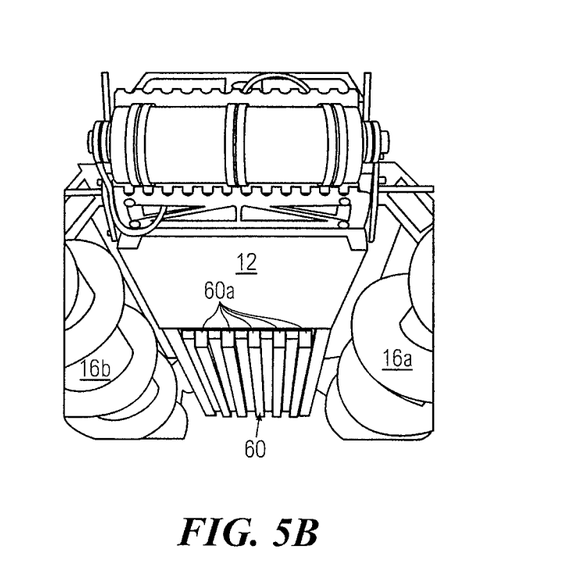

To further improve manoeuvrability of the vehicle 10 and, in particular, to ensure the vehicle 10 is manoeuvrable even if it becomes trapped on an obstacle (e.g. a snow/ice mound) such that the propulsion screws no longer make effective contact with the physical surface, a crawler mechanism 60 is provided. The crawler mechanism 60 as illustrated in FIGS. 5A and 5B comprises rows of parallel segments 60a extending from the bottom surface of the hull 12, substantially parallel to the longitudinal axis 24 of FIG. 1. In the figures illustrated, two groups of five rows of segments 60a are provided, giving a total of ten segments 60a. The segments 60a are arranged in an alternating fashion such that segments of different groups are adjacent one another. In use, the first group of segments 60a extends downward and rearward to lift the vehicle 10 and to move it forward by a small distance. The extension of the first group of segments is shown in FIG. 5A. The first group of segments 60a then retracts back toward the hull 12, and the second group of segments 60a extends downward and rearward, again to lift the vehicle 10 and to move it forward by a small distance. The extension of the second group of segments is shown in FIG. 5B. The combined effect of this alternating operation of the two groups of segments 60a is that the vehicle 12 is able to 'crawl' its way forward until such time as the propulsion screws are able to engage the ground for manoeuvrability. Where necessary or desired, the crawler mechanism 60 may also be operated while the propulsion screws are in effective operation. In this manner, the crawler mechanism 60 serves to provide additional traction in loose snow or ice. In the figures illustrated, the crawler mechanism 60 is arranged closer to the stern of the vehicle to ensure that the vehicle 10 is stable when being supported by the crawler mechanism 60 (given that the centre of gravity of the vehicle in the embodiment shown is closer to the stern). In an alternative embodiment, the crawler mechanism 60 comprises one or more caterpillar tracks disposed beneath the hull, preferably parallel to the longitudinal direction 24 as indicated in FIG. 1.

Figure 6A:
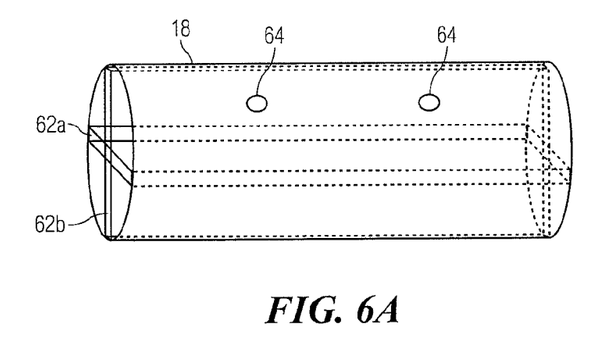
FIGS. 6A and 6B are schematics of a side view and a front cross-section of one embodiment of the propulsion screws.
Figure 6B:
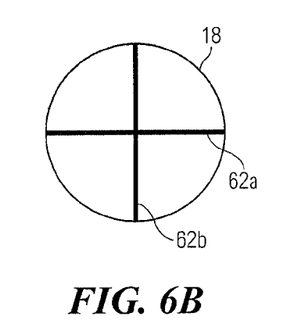

Referring now to FIGS. 6A and 6B, an alternative embodiment of the propulsion screw is shown. Only the shaft 18 of the propulsion screw is shown in the figures for clarity (i.e. the blade around the shaft and the cone-shaped terminations at either end have been omitted for clarity). The shaft 18 includes two or more plates 62a, 62b arranged in its internal cavity, with the plates 62a, 62b being substantially perpendicularly with respect to each other. This creates four compartments within each shaft 18. Two or more holes 64 are also provided on the shaft 18 to allow water to enter and exit the propulsion screw. It has been found that the entry and exit of water from the holes 64 contribute to hydrodynamic damping of the vehicle 10. In addition, the entry and exit of water from the compartments have been found to promote stabilization of the vehicle 10, in particular during self-righting of the vehicle 10.

Figure 7:
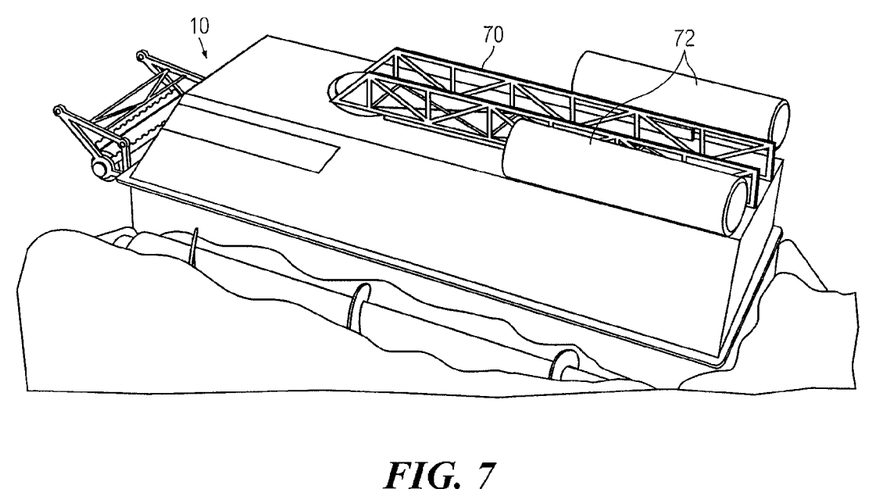
FIG. 7 is a top perspective view of another embodiment of the vehicle.

A further alternative embodiment of the vehicle 10 is shown in FIG. 7. In this embodiment, the uprighter of the vehicle 10 is in the form of a boom 70. The boom 70 is arranged to be pivotable vertically and rotated horizontally so that it can be swung in any direction and rotated by 360°. Like the uprighter, the boom 70 allows self-righting of the vehicle 10 on ice or land by pushing against any surface to urge the vehicle 10 back upright. The boom 70 may also be pivoted or rotated to port or starboard to appropriately balance the vehicle 10. As the moment produced by the boom 70 is greater than that produced by the uprighter of FIGS. 1 and 2 (given the length of the boom 70), self-righting and stabilization are improved using the boom 70. Balancing and stabilization are further improved by placing cylinders 72 at the distal or remote end of the boom 70. The cylinders 72, which may contain water for use by persons in the vehicle 10, provide additional weight and thus additional moment. Where air is provided in the cylinders 72, buoyancy will be provided by the boom 70 to assist in uprighting the vehicle 10 in water. The boom 70 is also able to provide rescue functions, including allowing a person overboard to be picked up (i.e. a man-overboard or MOB function) and allowing persons within the vehicle to evacuate the vehicle safely.

To serve as an evacuation vehicle for an offshore rig, the vehicle 10 is preferably configured to be able to withstand free falling from a platform of the offshore rig into water. The vehicle 10 may simultaneously or alternatively be provided with attachment points for connection with cables suspended from a davit on the platform in order to be lowered from the platform onto water, ice or snow when necessary. Entry and exit to the vehicle 10 is preferably provided aft of the hull 12. Emergency exits, e.g. through hatches, and access may further be provided on the roof 38 and/or at a bottom surface of the hull 12.

Besides use as an evacuation vehicle for an offshore rig, the vehicle 10 may be suitably adapted for use as a transport vehicle by the military or other organizations due to its relatively high speed in open water. Also, by being safely manoeuvrable over land, ice and water, the vehicle 10 prevents drowning hazards due to inadvertent breaking through of ice when travelling over frozen ponds or lakes.

Whilst there has been described in the foregoing description exemplary embodiments of the present invention, it will be understood by those skilled in the technology concerned that many variations in details of design, construction and/or operation may be made without departing from the present invention. For example, more than one blade 20 may be helically wound around each propulsion screw 16 to improve propulsion in water and traction on ice, snow or land. The shaft 18 of each propulsion screw 16 may be tapered instead of being cylindrical. These variations, for instance, are intended to be covered by the scope of the claims.

The invention claimed is:

1. A vehicle suitable for use in arctic environments, the vehicle comprising:
    a hull for accommodating people;
    a pair of rotatable propulsion screws connected to the hull for propelling the vehicle on water, ice, snow and land, each propulsion screw comprising a shaft having at least one blade helically disposed therearound;
    a climber mechanism connected to the hull for assisting in moving the vehicle out of water onto ice, the climber mechanism comprising a plurality of spiked bars for engaging the ice to effect a climbing action on the ice; and
    a crawler mechanism at a bottom surface of the hull, the crawler mechanism comprising one or more rows of toothed segments configured to extend downward and rearward to lift the vehicle and to move the vehicle forward.

2. The vehicle of claim 1, wherein the hull provides buoyancy to the vehicle.

3. The vehicle of claim 1, wherein each propulsion screw comprises a cone-shaped termination at either end.

4. The vehicle of claim 1, wherein the propulsion screws have ripples on their surfaces.

5. The vehicle of claim 1, further comprising at least one uprighter disposed on a roof of the hull for righting the vehicle when the vehicle is overturned.

6. The vehicle of claim 5, wherein the uprighter is moveable relative to the roof.

7. The vehicle of claim 5, wherein the uprighter has a higher buoyancy in water compared to other parts of the vehicle.

8. The vehicle of claim 1, wherein the climber mechanism is connected to the hull by extension arms, the extension arms being adjustable with respect to the hull in terms of one or more of: reach in a longitudinal direction, height and angle.

9. The vehicle of claim 1, wherein the plurality of spiked bars are arranged parallel to and spaced apart from each other.

10. The vehicle of claim 1, further comprising a closed heating system configured to draw heat away from one or more engines of the vehicle and to circulate the heat around the hull for de-icing purposes.

11. The vehicle of claim 1, wherein the rows of toothed segments are operable in groups of rows, the groups being configured to extend downward and rearward in an alternating fashion.

12. The vehicle of claim 11, wherein toothed segments of different groups are arranged adjacent one another.

13. The vehicle of claim 1, wherein each propulsion screw includes two plates arranged in its internal cavity, the two plates being substantially perpendicular to one another.

14. The vehicle of claim 1, wherein each propulsion screw includes two or more holes configured to allow water to enter and exit an internal cavity of the propulsion screw.

15. The vehicle of claim 5, wherein the uprighter comprises a boom pivotally and rotatably attached to the roof of the hull.

16. The vehicle of claim 1, wherein the vehicle is configured to be launched by freely falling from a platform of an offshore rig into water.

17. The vehicle of claim 1, wherein the vehicle comprises attachment points for connection with cables suspended from a davit on a platform of an offshore rig.

18. The vehicle of claim 1, wherein the vehicle is configured to drive out of a garage on a platform of an offshore rig.

* * * * *